United States Patent
Fukuzawa et al.

[11] Patent Number: 6,146,776
[45] Date of Patent: Nov. 14, 2000

[54] MAGNETO-RESISTANCE EFFECT HEAD

[75] Inventors: Hideaki Fukuzawa, Sagamihara; Yuzo Kamiguchi; Naoyuki Inoue, both of Yokohama; Hitoshi Iwasaki, Yokosuka; Noriyuki Ito, Komoro; Taro Oike; Hiroaki Kawashima, both of Saku, all of Japan

[73] Assignees: Kabushiki Kaisha Toshiba, Kawasaki; TDK Corporation, Tokyo, both of Japan

[21] Appl. No.: 09/072,044

[22] Filed: May 5, 1998

[30] Foreign Application Priority Data

May 7, 1997 [JP] Japan .................................. 9-117236

[51] Int. Cl.$^7$ ...................................................... G11B 5/66
[52] U.S. Cl. ................ 428/692; 428/694 R; 428/694 T; 428/694 TS; 428/694 TM; 428/900; 360/113; 324/252
[58] Field of Search ............................ 428/694 R, 694 T, 428/694 TS, 694 TM, 692, 900; 360/113; 324/252

[56] References Cited

U.S. PATENT DOCUMENTS

| 4,639,806 | 1/1987 | Kira et al. | 360/113 |
|---|---|---|---|
| 4,771,349 | 9/1988 | Tsang | 360/113 |
| 5,018,037 | 5/1991 | Krounbi et al. | 360/113 |
| 5,434,826 | 7/1995 | Ravipati et al. | 367/140 |
| 5,549,978 | 8/1996 | Iwasaki | 428/692 |
| 5,654,854 | 8/1997 | Mallary | 360/113 |
| 5,733,370 | 3/1998 | Chen et al. | 117/105 |
| 5,742,162 | 4/1998 | Nepela et al. | 324/252 |
| 5,748,416 | 5/1998 | Tobise et al. | 360/113 |
| 5,867,351 | 2/1999 | Gill | 360/113 |
| 5,876,843 | 3/1999 | Ishiwata | 428/209 |
| 5,883,764 | 3/1999 | Pinarbasi | 360/113 |
| 5,896,251 | 4/1999 | Ohsawa et al. | 360/113 |
| 5,923,503 | 7/1999 | Sato et al. | 360/327 |
| 5,936,810 | 8/1999 | Nakamoto et al. | 360/324.1 |

FOREIGN PATENT DOCUMENTS

| 0768643 A2 | 4/1997 | European Pat. Off. |
| 4-245011 | 9/1992 | Japan |
| 7-182629 | 7/1995 | Japan |
| 9-97409 | 5/1996 | Japan |

OTHER PUBLICATIONS

Zhu, "Impact of Microstructure on Stability . . . " IEE Transactions on Magnetics. vol. 32, No. 1, Jan. 1996.

Jian–Gang Zhu et al., "Impact of Microstructure on Stability of Permanent Magnet Biased Magnetoresistive Heads", IEEE Transactions on Magnetics, vol. 32, No. 1, pp. 54–60, (Jan. 1996).

S. Tadokoro et al., "Magnetic Properties of FeCr/CoCrPt Hard Magnetic Films", Proceedings of the 20th Japanese Applied Magnetism Society, 23pA–2, p. 364, (1996).

H. Yoda et al., "Dual–Element GMR/Inductive Heads for Gigabits Density Recording Using CoFe Spin–Valves", IEEE Transactions on Magnetics, vol. 32, No. 5, pp. 3363–3367, (Sep. 1996).

(List continued on next page.)

*Primary Examiner*—Leszek Kiliman
*Attorney, Agent, or Firm*—Finnegan, Henderson, Farabow, Garrett & Dunner, L.L.P.

[57] ABSTRACT

A GMR head comprising a spin valve GMR film, which has a free layer containing a Co containing magnetic layer, and a hard magnetic biasing film for inputting a bias magnetic field to the spin valve GMR film. The hard magnetic biasing film is constituted of a film formed by laminating a hard magnetic layer on the magnetic under layer. The hard magnetic layer is disposed adjoining to edge portion of the spin valve GMR film through the magnetic under layer. The magnetic under layer has saturation magnetization $Ms^{under}$ which satisfies at least one condition of $Ms^{under} \geq Ms^{free}$ and $Ms^{under} \geq Ms^{hard}$ when saturation magnetization of the free layer is $Ms^{free}$ and saturation magnetization of the hard magnetic layer is $Ms^{hard}$. In a MR head of this abutted junction structure, even when the track width is narrowed, occurrence of Barkhausen noise can be effectively suppressed.

19 Claims, 14 Drawing Sheets

OTHER PUBLICATIONS

Gao et al., "Correlation of bulk saturation magnetization with signal-to-media-noise ratio of Co-Cr-(Pt)-Ta alloy thin film disks," Journal of Magnetism and Magnetic Materials (1999), pp. 253–257.

Choe et al., "High coercivity CoPtCr, CoPT films deposited at high power and high bias conditions for hard bias applications in magnetoresistive heads," J. Appl. Phys. (Apr. 15, 1997) 81:4894–96.

Abarra et al., "Magnetic Force Microscopy Analysis of Thermal Stability in 8 $Gbit/in^2$ Longitudinal Recording Media," Journal of The Magnetics Society of Japan (1997), 21:291–296.

Zhu et al., "Effect of In-Plane Easy Axis Orientation in Narrow Track Recording," IEEE Transactions on Magnetics (Jan. 1992), 29:324–329.

PRIOR ART

MAGNETO-RESISTANCE EFFECT HEAD

BACKGROUND OF THE INVENTION

1. Field of the Invention

The present invention relates to a magneto-resistance effect head which takes advantage of a magnetic multi-layer film showing a giant magneto-resistance effect.

2. Description of the Related Art

In a magnetic recording device such as a HDD, in order to improve recording density, such a trend as that a recording track width of a medium is decreased is prevailing. To compensate decrease of read output which accompanies the decrease of the recording track width, a highly sensitive magneto-resistance effect (MR) head is being required.

In particular, a MR head using a spin-valve film which shows a giant magneto-resistance effect is considered promising. A spin-valve film possesses a magnetic multi-layer film formed on a substrate by sequentially laminating thereon a ferromagnetic layer whose magnetization rotates corresponding to signal magnetic field (hereinafter referred to as free layer), a non-magnetic layer, a ferromagnetic layer which magnetization is pinned (hereinafter referred to as magnetic pinned layer), and an anti-ferromagnetic layer for pinning magnetization of the magnetic pinned layer.

In an MR head taking advantage of a spin-valve film, there are such problems in putting to practical use as Barkhausen noise which occurs due to discontinuous movement of Bloch wall of the free layer and read fringe in the neighborhood of both edge portions of a width direction of a read track. In order to solve such problems, for example, as shown in FIG. 22, an MR head of an abutted junction structure is proposed in which outsides of the both edge portions which deviate from recording track width $W_t$ of a spin-valve film 1 are etched to be eliminated and thereon hard magnetic layers 2 are respectively disposed as hard magnetic biasing films.

In a spin valve type MR head shown in FIG. 22, a spin-valve film 1 comprises a free layer 3, a non-magnetic layer 4, a pinned layer 5 and an anti-ferromagnetic layer 6. On the hard magnetic layer 2, to supply sense current to the spin-valve film 1 therethrough, electrodes 7 are formed respectively. Though not shown in the figure, the spin-valve film 1 is interposed between a pair of an upper and a lower magnetic shield layers disposed respectively through magnetic gap.

In an MR head of an abutted junction structure shown in FIG. 22, by vanishing magnetic domain of the free layer 4 with the bias magnetic field from the hard magnetic layer 2, Barkhausen noise is suppressed. Further, while leaving the spin-valve film corresponding to the read track width $W_r$, the portions outside their edge portions are replaced by the hard magnetic layers 2. Therewith, recording information only from a recording track can be read, thereby read fringe can be made small.

Now, in order to respond to a further high densification of magnetic recording density, even in the spin valve type MR head, there is a demand in further narrowing the gap (thinning of the gap film). When the abutted junction structure is employed in an MR head having a more narrow gap, even if bias force is tried to be enhanced, for example, by making thick the thickness of the hard magnetic layer 2 serving as a hard magnetic biasing film, since the bias magnetic field leaks to the magnetic shield layer, it is difficult to obtain effective bias force.

As described above, in the spin valve type MR head, although the abutted junction structure is effective fundamentally in suppressing Barkhausen noise due to Bloch wall of the free layer, due to gap narrowing and track narrowing of the MR head, effective inputting of the bias magnetic field to the free layer is becoming difficult. In particular, when a track is made narrow, although the bias magnetic field should be effectively inputted, conversely, it has become clear that, as the track width becomes more narrow, Barkhausen noise becomes likely to occur. These facts are made clear for the first time through the results obtained by the present inventors.

From the above, in a spin valve type MR head of the abutted junction structure, it is required to clarify the causes of Barkhausen noise when the track width is made more narrow and to devise a countermeasure.

SUMMARY OF THE INVENTION

Therefore, an objective of the present invention is, in a spin valve MR head of an abutted junction structure, to provide a magneto-resistance effect head which enables effective suppression of occurrence of Barkhausen noise due to, for example, narrowing of the track width.

In order to attain the above objective, the present inventors systematically investigated relation between track widths and the incidence of Barkhausen noise with magneto-resistance effect elements different in saturation magnetization $M_s$ of the free layer. One example of our results are shown in FIG. 1. Here, longitudinal biasing films in FIG. 1 is a laminated film of TiW(10 nm)/CoPt(40 nm). From FIG. 1, it is obvious that as the track width becomes narrow, Barkhausen noise tends to occur, further, as saturation magnetization $M_s$ of a free layer of a magneto-resistance effect element becomes large, its tendency is remarkable and Barkhausen noise tends to occur.

The above described tendency contradicts to an idea that, when bias magnetic field is inputted from a hard magnetic layer, as a track width becomes more narrow, static magnetic field should be more effectively inputted to the magneto-resistance effect film. However, it can be explained when considered that, when a track width is narrow, demagnetization field increases at edge portion where the magneto-resistance effect film adjoins the hard magnetic film and influences greatly on buckling phenomenon. Further, neither difference in the incidence of Barkhausen noise can be explained simply by (Mr×t of biasing films)/(Ms×t of free layers) between the hard magnetic film and the free layer, but it can be explained if increase of the demagnetization field due to increase of the saturation magnetization Ms of the free layer is taken into consideration.

From the above described results, it is found that, hen a magneto-resistance effect element is made more narrow in its track width as a measure for obtaining a higher recording density, as an intrinsic problem of the narrow track structure, suppression of magnetic domain formation at edge portion of the free layer is important. Further, it is found that, for suppressing magnetic domain formation at the edge portion of the free layer, increase of the saturation magnetization of the hard magnetic biasing film as a whole is effective, and this that increase is attained through use of a laminated film formed with a magnetic under layer and a hard magnetic layer as the hard magnetic biasing film and through use of a magnetic material of high saturation magnetization for the magnetic under layer.

The present invention is obtained based on such findings.

A first magneto-resistance effect head of the present invention comprises a magneto-resistance effect film which has a free layer whose magnetization direction changes corresponding to external magnetic field, a non-magnetic layer stacked on the free layer and a pinned layer stacked on the non-magnetic layer, a hard magnetic biasing film having a magnetic under layer and a hard magnetic layer formed on the magnetic under layer by stacking, wherein the hard magnetic layer is adjoined to edge portion of the magneto-resistance effect film through the magnetic under layer, and electrode supplying sense current to the magneto-resistance effect film, herein, when saturation magnetization of the magnetic under layer is $Ms^{under}$, saturation magnetization of the free layer is $Ms^{under}$, the magnetic under layer satisfies a relation of $Ms^{under} \geq Ms^{free}$.

A second magneto-resistance effect head of the present invention comprises a magneto-resistance effect film which has a free layer which magnetization direction changes corresponding to external magnetic field, a non-magnetic layer stacked on the free layer, and a pinned layer stacked on the non-magnetic layer, a hard magnetic biasing film having a magnetic under layer and a hard magnetic layer formed on the magnetic under layer by stacking, wherein the hard magnetic layer is adjoined to edge portion of the magneto-resistance effect film through the magnetic under layer, and electrode supplying sense current to the magneto-resistance effect film, wherein, when saturation magnetization of the magnetic under layer is $Ms^{under}$, saturation magnetization of the hard magnetic layer is $Ms^{hard}$, the magnetic under layer satisfies a relation of $Ms^{under} \geq Ms^{hard}$.

In a first magneto-resistance effect head of the present invention, as a under layer of the hard magnetic layer for longitudinal biasing to the magneto-resistance effect film, a magnetic under layer having saturation magnetization ($Ms^{under}$) not smaller than saturation magnetization $Ms^{free}$ of the free layer is used. Thus, by employing a magnetic under layer large in saturation magnetization to a hard magnetic biasing film of abutted junction structure, fluctuation of magnetization direction of the hard magnetic biasing film accompanying magnetization rotation of the free layer can be suppressed. Therefore, the bias magnetic field can be inputted to the free layer stably and effectively, thus, occurrence of Barkhausen noise accompanying fluctuation of the magnetization of the hard magnetic biasing film can be suppressed.

Further, normally, it is difficult to make higher the saturation magnetization of a hard magnetic material. Therefore, in a second magneto-resistance effect head of the present invention, as a under layer of the hard magnetic layer which inputs a bias magnetic field, a magnetic under layer of the saturation magnetization ($Ms^{under}$) not smaller than the saturation magnetization $Ms^{hard}$ of the hard magnetic layer is used. According to a laminate film having such a magnetic under layer, the saturation magnetization of the hard magnetic biasing film as a whole can be made higher. Therefore, the bias magnetic field is inputted to the free layer stably and effectively, thus, occurrence of Barkhausen noise can be effectively suppressed.

DESCRIPTION OF THE PREFERRED EMBODIMENTS

In the following, some embodiments for implementing the present invention will be described with reference to drawings.

Figure 1:
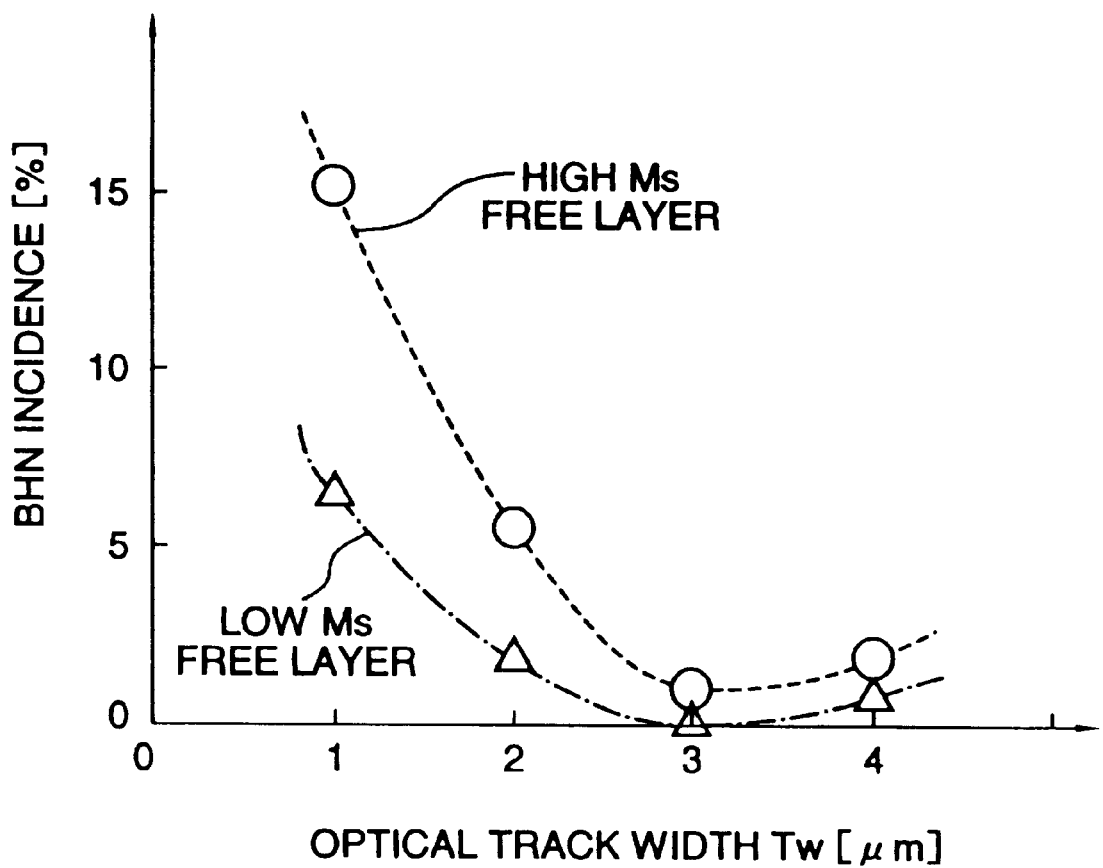
FIG. 1 is a diagram showing an example of a relationship between track widths and incidences of Barkhausen noise in magneto-resistance effect elements different in their saturation magnetization of the free layer.
Figure 2:
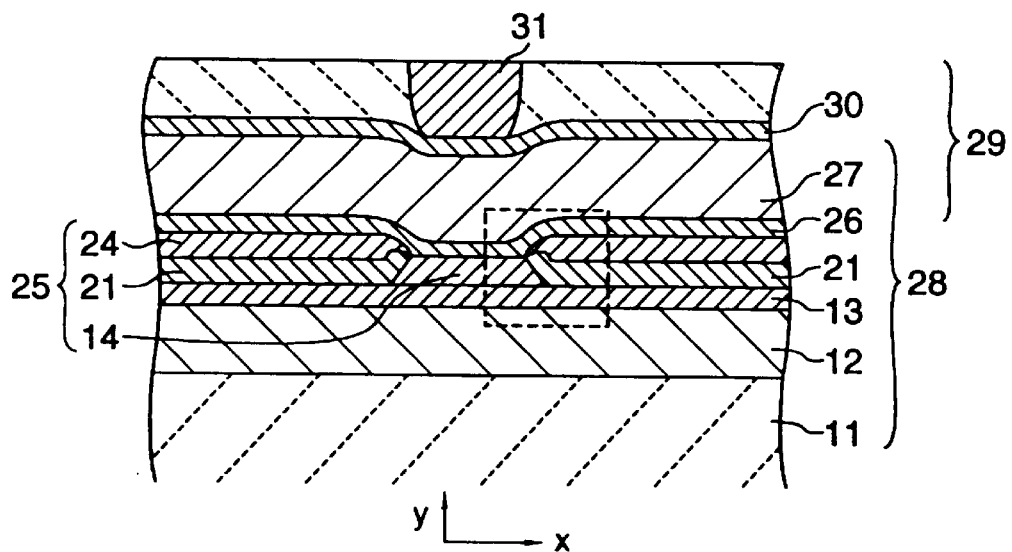
FIG. 2 is a sectional view seen from an air bearing surface showing a structure of essential portion of one embodiment in which a magneto-resistance effect head of the present invention is applied in a magnetic recording/read separation head.
Figure 3:
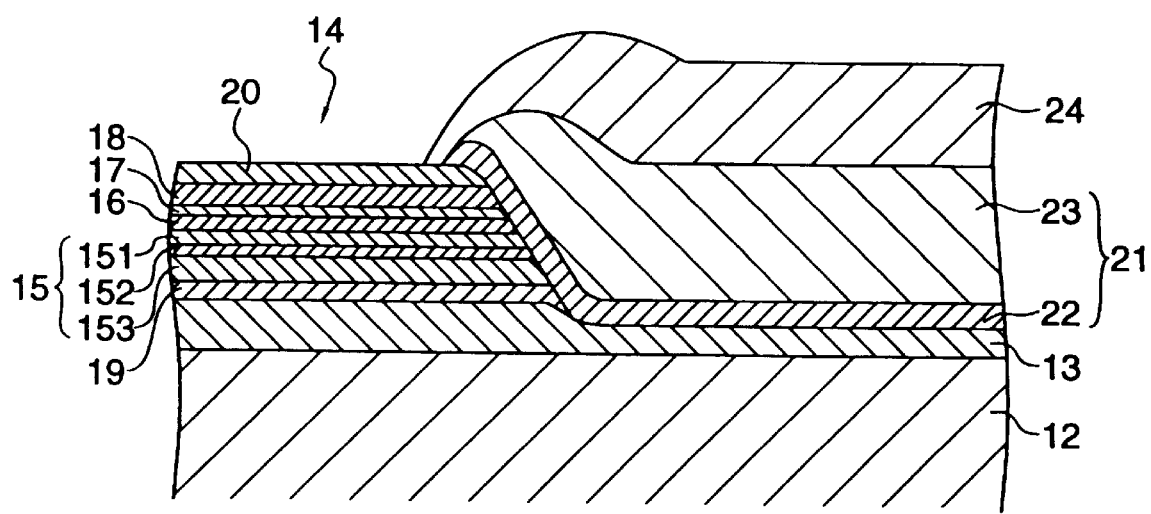
FIG. 3 is a sectional view showing in an expanded manner an essential portion of the magnetic recording/read separation head shown in FIG. 2.

FIG. 2 is a sectional view showing a structure of essential portion of one embodiment in which a magneto-resistance effect head of the present invention is applied in a magnetic recording/read separation head. FIG. 2 is a sectional view of a magnetic recording/read separation head seen from an air bearing surface, wherein x-direction is a direction of a recording track width and y-direction is a recording track running direction as well a direction of a film thickness. FIG. 3 is a sectional view showing in an expanded manner a portion surrounded by dotted line in FIG. 2.

In these diagrams, numeral 11 shows a substrate, and as a substrate 11, an $Al_2O_3 \times TiC$ substrate having an $Al_2O_3$ layer can be used. On a main surface of such a substrate 11, a lower side magnetic shield layer 12 composed of a soft magnetic material such as a CoZrNb amorphous alloy, a NiFe alloy, an FeSiAl alloy and the like is formed. On the lower side magnetic shield layer 12, a magneto-resistance effect film (MR film) 14 is formed through a lower side read magnetic gap 13 composed of a non-magnetic insulation material such as $AlO_x$.

An MR film 14 of the present invention has, for example as shown in FIG. 3, a magnetic multi-layered film obtained by laminating in sequential way, a free layer 15 varying its magnetization direction according to at least an external magnetic field, a non-magnetic layer 16, a pinned layer 17 and an anti-ferromagnetic layer 18, and is a so-called spin-valve film (spin valve GMR film) showing a giant magneto-resistance effect. A free layer 15 has, for example, a ferromagnetic layer 151 containing Co such as a CoFe alloy layer. This Co containing ferromagnetic layer 151 is disposed adjacent to a non-magnetic layer 16.

The Co containing ferromagnetic layer 151, to enhance a soft magnetic property as a free layer 15, is formed on, for example, a soft magnetic assist layer. For a soft magnetic assist layer, an amorphous based soft magnetic material and a soft magnetic material of a face-centered cubic lattice structure such as a NiFe alloy, a NiFeCo alloy, and a magnetic alloy obtained by adding various additional elements to these alloys are preferably used. In the present embodiment, below the Co containing ferromagnetic layer 151, as a soft magnetic assist layer, a NiFe alloy layer 152 and an amorphous CoZrNb alloy layer 153 are disposed in sequence.

Further, for the free layer 15, a NiFe alloy such as $N_{80}Fe_{20}$ (at %) can be employed.

A magnetic pinned layer 17 is formed on the free layer 15 through a non-magnetic layer 16 composed of Cu, Au, Ag on alloys thereof. The magnetic pinned layer 17 is composed of the Co containing ferromagnetic material such as CoFe alloy as identical with the free layer 15. The magnetic pinned layer 17 is magnetically pinned through an exchange coupling with an anti-ferromagnetic layer 18 composed of such as an IrMn alloy, an FeMn alloy, a NiMn alloy, a PtMn alloy, a PtRhMn alloy or NiO. Further, in the diagram, numeral 19 is a non-magnetic under layer consisting of such as Ta and Ti, and numeral 20 is a protective film consisting of the same material as the non-magnetic under layer. These are formed as occasion demands.

As a concrete constitution of a spin valve GMR film 14, a constitution formed by sequentially laminating from the substrate side, Ta(5 nm) 19/amorphous CoZrNb(5 nm) 153/NiFe(2 nm) 152/CoFe(3 nm) 151/Cu(3 nm) 16/CoFe(2 nm) 17/IrMn(5.5 nm) 18/Ta(5 nm) 20 and the like can be cited. As a concrete example of a constitution of a spin valve GMR film in which a NiFe alloy is used for a free layer, a constitution laminated sequentially from the substrate side such as Ta(5 nm)/NiFe(6 nm)/Co(1 nm)/Cu(3 nm)/Co(1 nm)/NiFe(2 nm)/IrMn(5.5 n m)/Ta(5 nm);

Ta(5 nm)/NiFe(6 nm)/CoFe(1 nm)/Cu(3 nm)/CoFe(2 nm)/IrMn(7 nm)/Ta (5 nm);

Ta(5 nm)/NiFe(6 nm)/CoFe(1 nm)/Cu(3 nm)/CoFe(3 nm)/Ru (0.8 nm)/CoFe(3 nm)/IrMn(7 nm)/Ta(5 nm) and the like can be cited.

A spin valve GMR film 14, in which a Co containing ferromagnetic material such as a CoFe alloy is employed for a part(151) of the free layer 15 and a magnetic pinned layer 17, shows a large rate of change of MR as well as a heat resistance during a head producing process and long term reliability. As the Co containing ferromagnetic material, Co or a Co alloy (Co based magnetic alloy) obtained by adding Fe, Ni, and the other element to Co can be cited, in particular, the Co alloy is preferably used.

As additional elements to a Co alloy, other than Fe and Ni above described, one or not less than two kinds of Pd, Au, Ag, Cu, Pt, Ir, Rh, Ru, Os, Hf can be used. An additional quantity of these elements is preferable to be set in the range of from 5 to 50 at %. Further, it is desirable to use a CoFe alloy containing Fe in the range of from 5 to 40 at % from the view-point of the rate of change of MR and an exchange coupling force with an anti-ferromagnetic layer 18.

A spin valve GMR film 14 consisting of the above described magnetic multi-layered film possesses a shape according to a magnetic field detection portion which detects an external magnetic field such as a signal magnetic field. In other words, so as for the length of x-direction of the spin valve GMR film 14 to become a desired track width, an outside portion overflowed from the recording track width is, for example, etched away.

Outside both edge portions of such a spin valve GMR film 14, a pair of hard magnetic biasing films 21 which input the bias magnetic field to the spin valve GMR film 14 are formed. That is, the hard magnetic biasing film 21 forms an abutted junction to the spin valve GMR film 14 to form a abutted junction structure.

The hard magnetic biasing film 21 has a laminate film formed between a magnetic under layer 22 and a Co based hard magnetic layer 23 consisting of a hard magnetic material containing Co such as CoPt alloy and CoCrPt alloy stacked on the magnetic under layer 22. In the hard magnetic biasing film 21 consisting of such a laminate film, the Co based hard magnetic layer 23 is disposed adjacent to the edge portion of the spin valve GMR film 14 through a magnetic under layer 22.

And, when saturation magnetization of a magnetic under layer 22 is $Ms^{under}$, saturation magnetization of a free layer 15 is $Ms^{free}$ and saturation magnetization of a Co based hard magnetic layer 23 is $Ms^{hard}$, the magnetic under layer 22 satisfies at least one relationship of $Ms^{under} \geq Ms^{free}$ and $Ms^{under} \geq Ms^{hard}$. It is preferable for both of these conditions to be satisfied. For the magnetic under layer 22, as explained in detail later, an FeCo alloy is preferably employed. Further, the saturation magnetization $Ms^{free}$ of the free layer 15 shows an average value when the free layer 15 has a laminate structure.

On a pair of bias magnetic field inputting layers 21, a pair of electrodes 24 consisting of Cu, Au, Zr, Ta and the like are formed. The spin valve GMR film 14 is supplied a sense current through a pair of electrodes 24. A GMR read element portion 25 is composed of a spin valve GMR film 14, a pair of hard magnetic biasing film 21, and a pair of electrodes 24.

On a GMR read portion 25, an upper side magnetic shield layer 27 is formed through an upper side read magnetic gap 26 consisting of a non-magnetic insulation material identical with the lower side read magnetic gap 13. The upper side magnetic shield layer 27 is composed of an identical soft magnetic material as the lower side magnetic shield layer 12. With these constituent elements, a shield type GMR head 28 as a read head is constituted.

Further, on a shield type GMR head 28, a thin film magnetic head 29 is formed as a recording head. A lower side recording magnetic pole of the thin film magnetic head 29 is constructed from the same magnetic layer as the upper side magnetic shield layer 27. That is, an upper side magnetic shield layer 27 of a shield type MR head 28 serves concurrently as a lower side recording magnetic pole of the thin film magnetic head 29.

On this lower side recording magnetic pole 27 concurrently serving as an upper magnetic shield layer, a recording magnetic gap 30 consisting of a non-magnetic insulation material such as $AlO_x$ and an upper side recording magnetic pole 31 are formed in sequential manner. Further, a recording coil (not shown) providing a recording magnetic field to the lower side recording magnetic pole 27 and the upper side recording magnetic pole 31 is formed on the behind side than an air bearing surface. These constitute a thin film magnetic head 29 which serves as a recording head.

In the following, an action and effect which a hard magnetic biasing film 21 consisted of a laminate film formed between the above described magnetic under layer 22 and a Co based hard magnetic layer 23 works on a spin valve GMR film 14.

Firstly, a case where a non-magnetic under layer is used as a under layer of a hard magnetic layer 23 is discussed. A non-magnetic under layer is effective in enhancing magnetic properties of a Co based hard magnetic layer formed in film thereon. In specific, since c-axis of Co-based hard magnetic alloy is aligned to the film plane, a coercive force Hc of direction in the plane becomes large and squareness ratio S(=Mr/Ms) of remanent magnetization Mr are improved. When viewed microscopically, due to the effect of the under layer, an anisotropic magnetic field $Hk^{grain}$ of a crystal grain of the Co based hard magnetic layer becomes large and contributes to improve hard magnetic characteristics.

However, if a non-magnetic under layer is applied in an abutted junction type GMR head, since a Co based hard magnetic layer and a free layer are magnetically discontinued, at the edge portion of the free layer, particularly the above described demagnetization field influences greatly. That is, the demagnetization field increases at the edge portion of the free layer and exerts a large influence on a buckling phenomenon. Further, a bias magnetic field from a Co based hard magnetic layer is not inputted effectively to the free layer and magnetic flux escapes to a direction of an upper layer portion which connects magnetically. As a result, a bias magnetic field for avoiding magnetic domain formation at the edge portion of the free layer can not be inputted and thereby induces Barkhausen noise.

In this case, even if (Mr×t of biasing films)/(Ms×t of free layers) with the free layer is made large by increasing the film thickness of the Co based hard magnetic layer, the above mentioned problem can not be avoided. Since, in the above problem, suppression only at the edge portion of the free layer is important, mere increase of the film thickness can not induce improvement of the bias force at the edge portion beyond limit. In particular, when the gap is made narrow, magnetic flux almost leaks to the magnetic shield layer.

Further, when a track width is made narrow, since the bias at the central portion of the free layer is originally enough, increase of the film thickness of the Co based hard magnetic layer only deteriorates sensitivity of the MR film. This problem is more remarkable as the track width becomes more narrow, Ms of the free layer becomes larger, and Ms of the Co based hard magnetic layer becomes smaller.

As one means for magnetically connecting the free layer and the Co based hard magnetic layer, there is a method in which, without resorting to a under layer, the Co based hard magnetic layer is directly formed into a film. However, this method induces another problem. First of all, since there is no under layer, magnetic property of the Co based hard magnetic layer deteriorates. In concrete, in-plane orientation of c-axis plane of the Co based hard magnetic layer deteriorates, coercive force within the plane Hc deteriorates, and also the squareness ratio S deteriorates. When viewed microscopically, anisotropic magnetic field $Hk^{grain}$ of crystalline grain of the Co based hard magnetic layer becomes small and potential as a hard magnetic layer becomes low.

Exchange coupling between the above described bias film and the free layer does not necessarily bring forth a good bias. Namely, when a free layer and a Co based hard magnetic layer small in its anisotropic magnetic field $Hk^{grain}$ are exchange coupled, accompanying magnetization rotation of the free layer, the direction of magnetization of the Co based hard magnetic layer becomes partially unstable. Thereby, Barkhausen noise tends to occur(Jian-Gang Zhu and Daniel J. O'Connor, IEEE TRANSACTIONS ON MAGNETICS. VOL.32 No.1, 54 (1996)). This tendency becomes more remarkable as Ms of the free layer becomes large, the anisotropic magnetic field $Hk^{grain}$ of the Co based hard magnetic layer becomes small, and Ms of the Co based hard magnetic layer becomes small.

Besides, as one means to overcome a part of the above problem, there is a report of a hard magnetic bias structure in which a magnetic under layer consisting of an FeCr alloy is used as a under layer of a Co based hard magnetic layer and thereon a CoCrPt alloy film is formed into a film (S. Tadokoro, K. Sato, T. Imagawa, K. Mitsuoka, S. Narishige: Magnetic Properties of FeCr/CoCrPt hard magnetic films: Proceedings of the 20th Japanese Applied Magnetism Society 23pA-2, 1996).

When a Co based hard magnetic layer is aligned to the film plane, since it is generally known that a bcc alloy is effective, as a film which has bcc structure and is magnetic, an FeCr alloy is used. When a magnetic under layer consisting of an FeCr alloy is employed, it is improved than two conventional examples in the following points that the free layer and the Co based hard magnetic layer are not magnetically discontinued and magnetic property of the Co based hard magnetic layer does not deteriorate.

However, the magnetic under layer consisting of an FeCr alloy can not solve all the above described problems. Because it does not take saturation magnetization $Ms^{under}$ of the magnetic under layer into consideration. As described above, when the free layer and the Co based hard magnetic layer are exchange coupled, it is necessary to pay enough attention to saturation magnetization $Ms^{under}$ of the magnetic under layer together with anisotropic magnetic field $Hk^{grain}$ of the Co based hard magnetic layer. Now, in the following, importance of saturation magnetization $Ms^{under}$ of a magnetic under layer as a under layer of a Co based hard magnetic layer will be explained in detail.

When a magnetic under layer is used, a free layer and a magnetic under layer, and a magnetic under layer and a Co based hard magnetic layer are exchange coupled, respectively. This means that, when a free layer is magnetically rotated by a magnetic field of a medium, through the exchange coupling, the direction of magnetization of the Co based hard magnetic layer is also strongly influenced. Now, discussion will be given on one case where both of the magnetic under layer and the Co based hard magnetic layer are low in saturation magnetization (low Ms) and another case where both of the magnetic under layer and the Co based hard magnetic layer are high in saturation magnetization (high Ms).

Figure 4A:
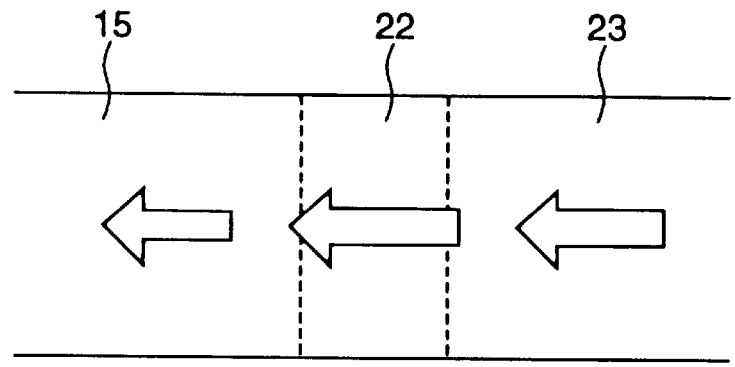
FIG. 4A, FIG. 4B, and FIG. 4C are diagrams showing schematically magnetization states accompanying magnetization rotation of free layers when both of a magnetic under layer and a hard magnetic layer have high saturation magnetization.
Figure 4B:
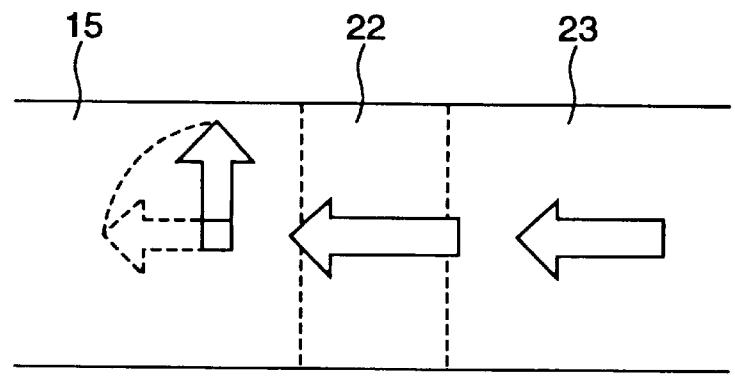
Figure 4C:
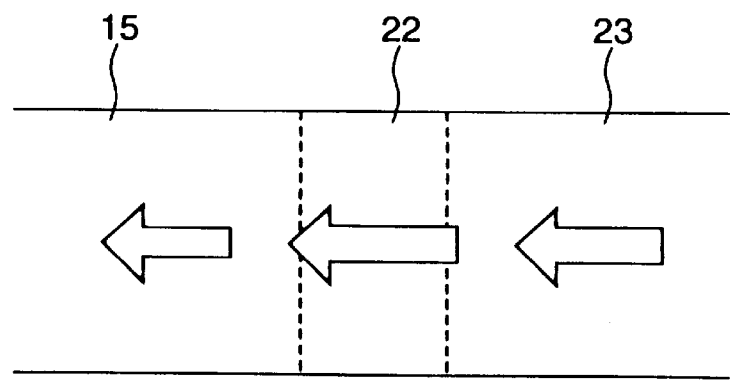
Figure 5A:
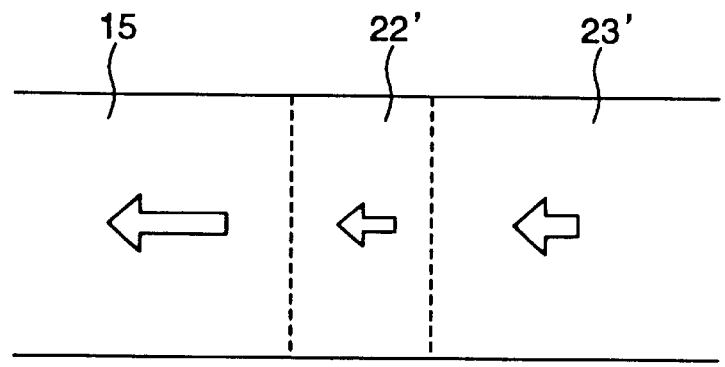
FIG. 5A, FIG. 5B, FIG. 5C are diagrams showing schematically magnetization states accompanying magnetization rotation of free layers when both of a magnetic under layer and a hard magnetic layer have low saturation magnetization.
Figure 5B:
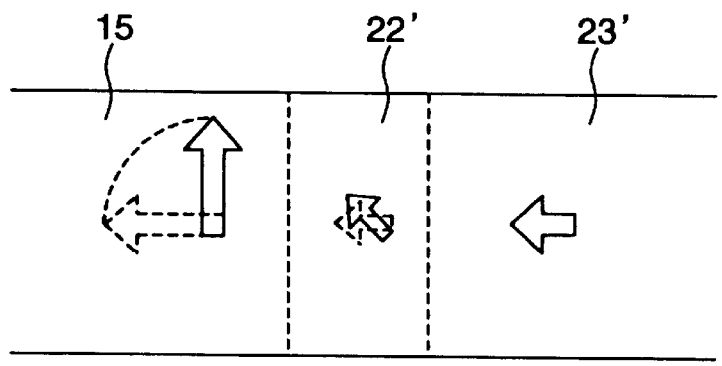
Figure 5C:
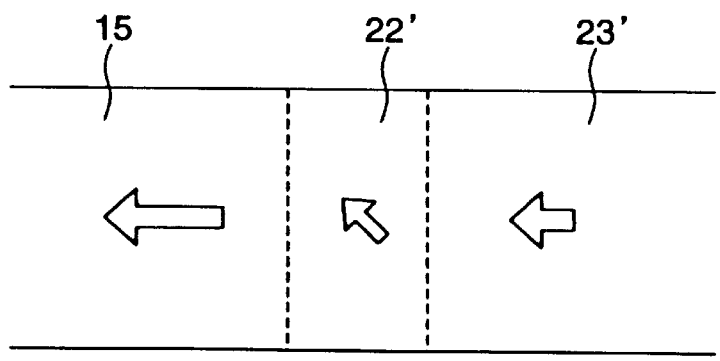

FIG. 4A, FIG. 4B, and FIG. 4C show schematically states of magnetization where both of a magnetic under layer and a Co based hard magnetic layer are in high Ms state. FIG. 5A, FIG. 5B, and FIG. 5C show schematically states of magnetization where both of a magnetic under layer and a Co based hard magnetic layer are in low Ms state. Both of two figures show states of film plane direction (direction of track width (x)).

As shown in FIG. 5A, FIG. 5B, and FIG. 5C, in a low Ms magnetic under layer 22', when a free layer 15 rotates magnetically (FIG. 5B), through exchange coupling, the magnetic under layer 22' is set in a state where magnetization can be easily rotated, thereby induces hysteresis (a state shown in FIG. 5C) to cause noise to occur. This state becomes more remarkable when Ms of the hard magnetic layer 23' is small. This is a bias structure where a conventional magnetic under layer is used. For example, in an FeCr alloy, as Cr concentration increases, the Ms decreases, and, for example, at 25 at % of the Cr concentration, the Ms is about 920 emu/cc. This value is remarkably small compared with the Ms value of such as Co contained ferromagnetic material (for example, the Ms value of a CoFe alloy is about 1500 emu/cc) and capable of causing noise to occur.

Since a magnetic under layer 22 of the present invention possesses a high Ms instead of the above described conventional magnetic under layer 22', noise occurrence due to rotation of magnetization of the magnetic under layer can be suppressed.

That is, as shown in FIG. 4A, FIG. 4B, and FIG. 4C, when a magnetic under layer 22 of a high Ms is used, if the free layer 15 rotates magnetically (a state shown in FIG. 4B), the direction of magnetization of the magnetic under layer 22 is stable as shown in FIG. 4C. Thus, instability of the direction of the magnetization of the magnetic under layer 22 due to exchange coupling between the magnetic under layer 22 and the free layer 15 can be eliminated.

Upon materializing such a state, in the present invention, for a magnetic under layer 22, a magnetic material layer possessing a saturation magnetization $Ms^{under}$ which value is not smaller than a saturation magnetization $Ms^{free}$ of the free layer 15, that is, satisfies $Ms^{under} \geq Ms^{free}$, is used. In other words, by employing a magnetic under layer 22 satisfying $Ms^{under} \geq Ms^{free}$, the noise occurrence due to instability of magnetization of the magnetic under layer 22 can be suppressed.

In this case, when such as a NiFe alloy is used for the free layer, since its saturation magnetization is small such as not exceeding about 800 emu/cc, the instability of the magnetization of the magnetic under layer 22 does not cause a big problem especially in case of track width is not narrow. On the contrary, when a Co containing ferromagnetic material high in Ms such as, for example, not less than 800 emu/cc (for example, CoFe alloy; Ms=about 1500 emu/cc) is used for the free layer 15, noise occurrence due to instability of the magnetization of the magnetic under layer 22 may happen.

The present invention solves the problem which occurs when a free layer 15 of such a high Ms is used. Further, the present invention is also effective even when a NiFe alloy layer is used as the free layer. Also for the free layer consisting of a NiFe alloy, by employing a high Ms magnetic under layer 22, the bias magnetic field can be effectively inputted. Thus, more effectively, noise occurrence can be suppressed.

Figure 6:
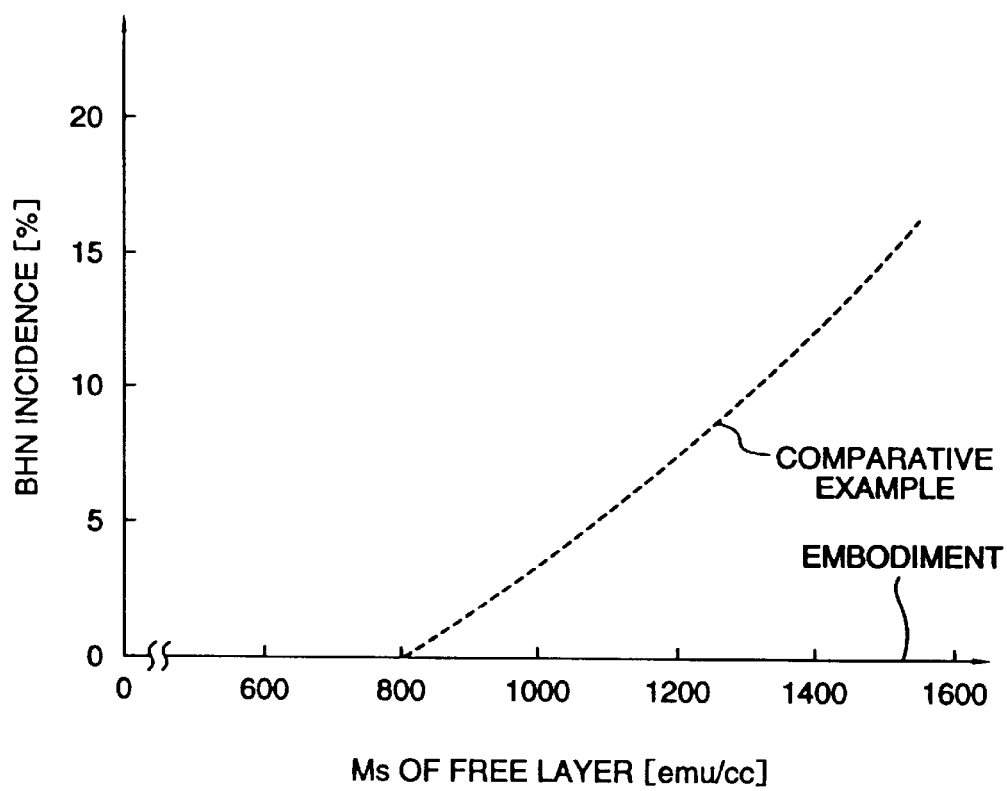
FIG. 6 is a diagram showing a relationship between a saturation magnetization of a free layer $Ms^{free}$ and incidence of Barkhausen noise.

In FIG. 6, a relationship between Ms of a free layer 15 and incidence of Barkhausen noise is shown. Here, incidence of Barkhausen noise is obtained by using an only one-side shielded(without upper magnetic shield) fine element (same size with real head, the size in height direction is decided by patterning with PEP method instead of polishing) instead of a real head.

Whether Barkhausen noise occurs or not is determined by the following manner. When static magnetic characteristics ($\rho$-H curve) of a fine element is measured, if no jump is found in the $\rho$-H curve, it is decided that there is no Barkhausen noise occurrence. If any jump is found in the $\rho$-H curve, it is decided that there is Barkhausen noise occurrence. Incidence of Barkhausen noise is determined, after measuring a certain number of fine elements of same parameter, by dividing the number of fine elements which showed Barkhausen noise by measured fine element number, then by multiplying the obtained number with 100. Now, the incidences of Barkhausen noise shown in the following are obtained in the identical manner as the above.

In FIG. 6, embodiments shown with a solid line are examples in which a laminate film of FeCo(5 nm)/CoPt(25 nm)/is employed for a hard magnetic biasing film 21. In the comparative examples, a laminate film of TiW(10 nm)/CoPt (40 nm) is employed for a hard magnetic biasing film. From the results of the comparative examples, when the Ms of the free layer 15 is 800 emu/cc or more, the incidence of Barkhausen noise becomes high. On the contrary, by employing a magnetic under layer 22 of high Ms, even if the Ms of the free layer 15 is 800 emu/cc or more, occurrence of Barkhausen noise can be effectively suppressed.

Further, as the track width becomes more narrow as described above, influence of the demagnetization field at the edge portion of the free layer becomes large, thus, Barkhausen noise becomes likely to occur. The present invention is to suppress the increase of Barkhausen noise due to narrowing of the track width. In specifically, when the length of the direction of the track width (x) of a spin valve GMR film 14 is 3 $\mu$m or less, the present invention is particularly effective.

Figure 7:
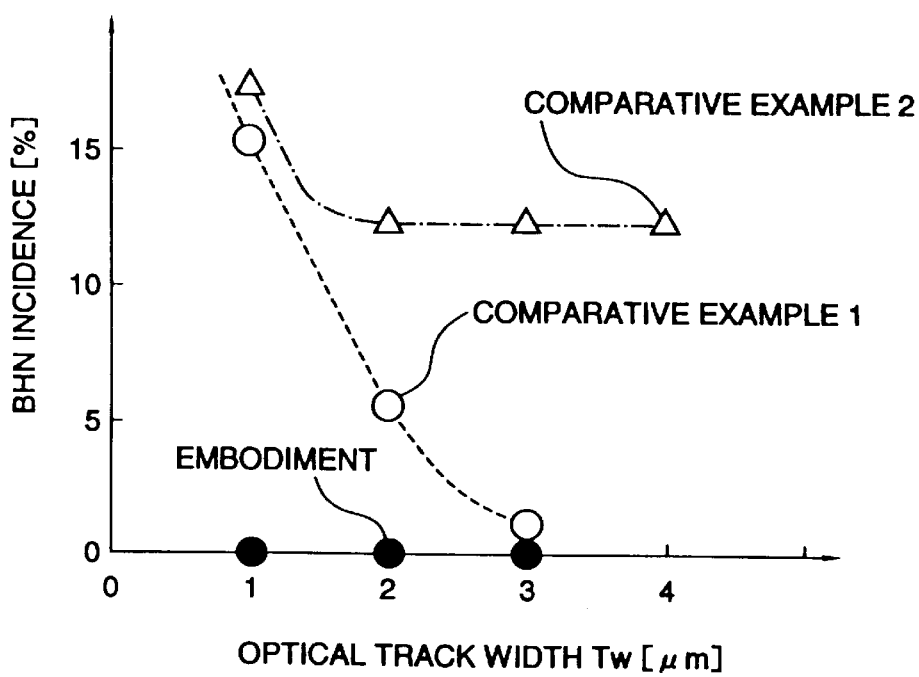
FIG. 7 is a diagram showing a relationship between a track width and incidence of Barkhausen noise.

FIG. 7 shows a relationship between the track width and the incidence of Barkhausen noise. In the embodiment shown in FIG. 7, a laminate film of FeCo(5 nm)/CoPt(25 nm) is used for a bias magnetic field inputting layer 21. A laminate film of TiW(10 nm)/CoPt(40 nm) and a film of CoPt(40 nm) are respectively used for the hard magnetic biasing films in comparative example 1 and 2.

In FIG. 7, in the comparative example 1 where a non-magnetic under layer is used, noise of buckling mode which increases as the track width becomes narrow is found. Further, in the comparative example 2 where the under layer is not used, noise based on the instability of the hard magnetic layer due to the exchange coupling with the free layer can be found. In these both cases, when the length of the direction of the track width (x) of a spin valve GMR film 14 is 3 $\mu$m or less, incidence of Barkhausen noise becomes remarkably high.

Contrary to these comparative example 1 and 2, in the embodiment where the magnetic under layer 22 of high Ms is used, even if the length of the direction of the track width (x) of the spin valve GMR film 14 is in the range of 3 $\mu$m or less, Barkhausen noise can be effectively suppressed from occurring.

Here, since the magnetic under layer 22 itself does not possesses hard magnetic property, sufficient suppression due to the exchange coupling with the hard magnetic layer 23 is required. In order to suppress the magnetic under layer 22 of high Ms, a certain degree of (Mr×t of biasing films)/(Ms×t of free layers) is required between a magnetic under layer 22 and a hard magnetic layer 23. Thus, it is desirable for the hard magnetic layer 23 itself also to be high Ms.

Since the magnetic volume varies according their thickness, when the thickness of the magnetic under layer 22 is $t^{under}$, the thickness of the hard magnetic layer 23 is $t^{hard}$, the magnetic under layer 22 and the hard magnetic layer 23 are preferable to satisfy a relationship of $Ms^{under} \times t^{under} \geq Ms^{hard} \times t^{hard}$. Further, when the thickness of the magnetic under layer 22 is too thick, since there is a possibility of insufficient suppression by the hard magnetic layer 23, it is preferable to set the thickness $t^{under}$ of the magnetic under layer 22 at 20 nm or less.

Figure 8:
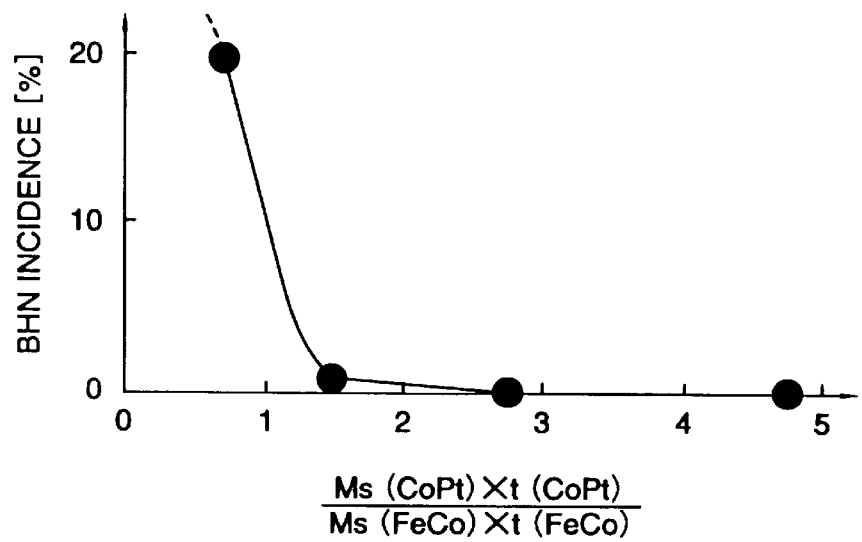
FIG. 8 is a diagram showing a relationship between a $(Ms^{hard} \times t^{hard})/(Ms^{seed} \times t^{under})$ ratio and incidence of Barkhausen noise.

In FIG. 8 where an FeCo alloy is used for a magnetic under layer 22 and a CoPt alloy is used for a hard magnetic layer 23, a relationship between the ratio of $(Ms^{under} \times t^{under})$ and $(Ms^{hard} \times t^{hard})$ $((Ms^{hard} \times t^{hard})/(Ms^{under} \times t^{under}))$ and incidence of Barkhausen noise is shown. When the magnetic under layer 22 and the hard magnetic layer 23 satisfy a relationship of $Ms^{under} \times t^{under} \geq Ms^{hard} \times t^{hard}$, the incidence of Barkhausen noise becomes low.

Figure 9:
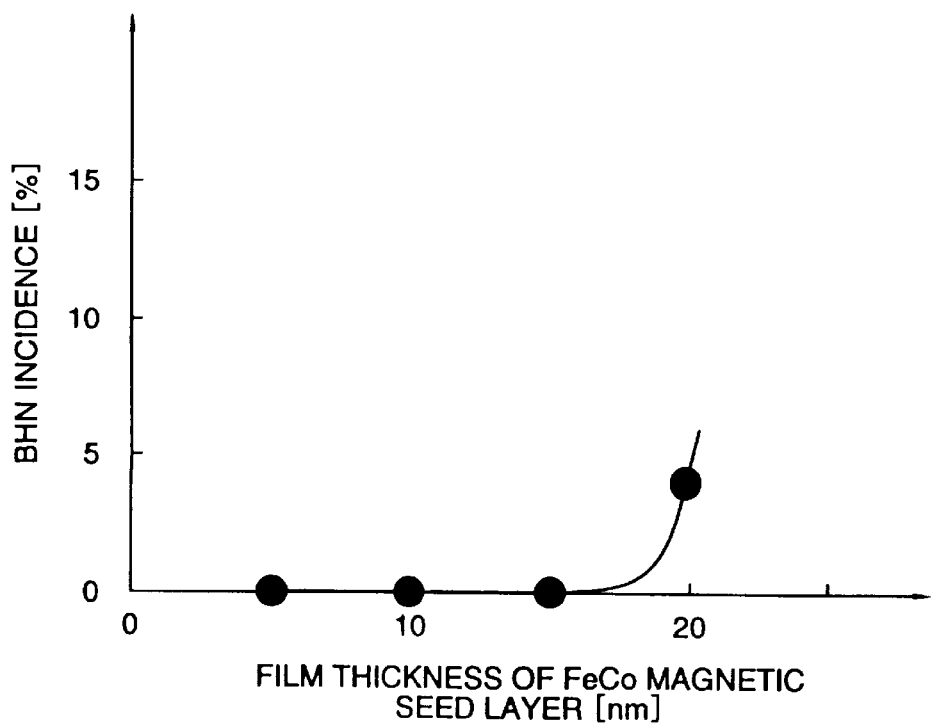
FIG. 9 is a diagram showing a relationship between a thickness $t^{under}$ of a magnetic under layer and incidence of Barkhausen noise.

In FIG. 9 where an FeCo alloy is used for the magnetic under layer 22, the relationship between its thickness $t^{under}$ and the incidence of Barkhausen noise is shown. Here, $(Ms^{hard} \times t^{hard})/(Ms^{under} \times t^{under})$ is fixed at 2. When $t^{under}$ is 20 nm or less, the incidence of Barkhausen noise becomes particularly low.

Figure 10:
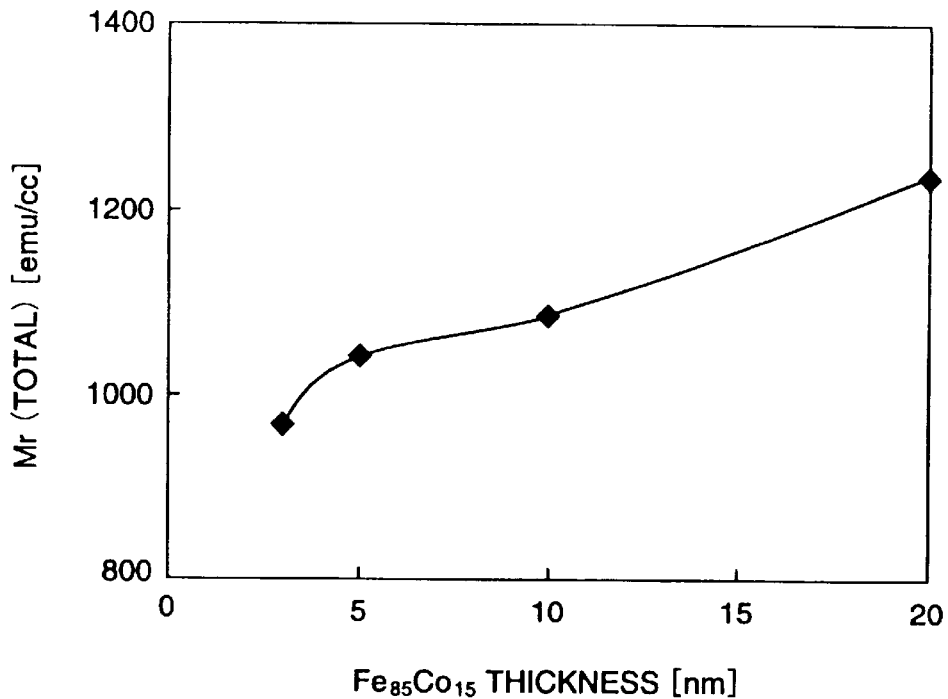
FIG. 10 is a diagram showing dependency of a remanent magnetization $Mr^{total}$ as a laminate film of a hard magnetic biasing film on a thickness of a magnetic under layer.
Figure 11:
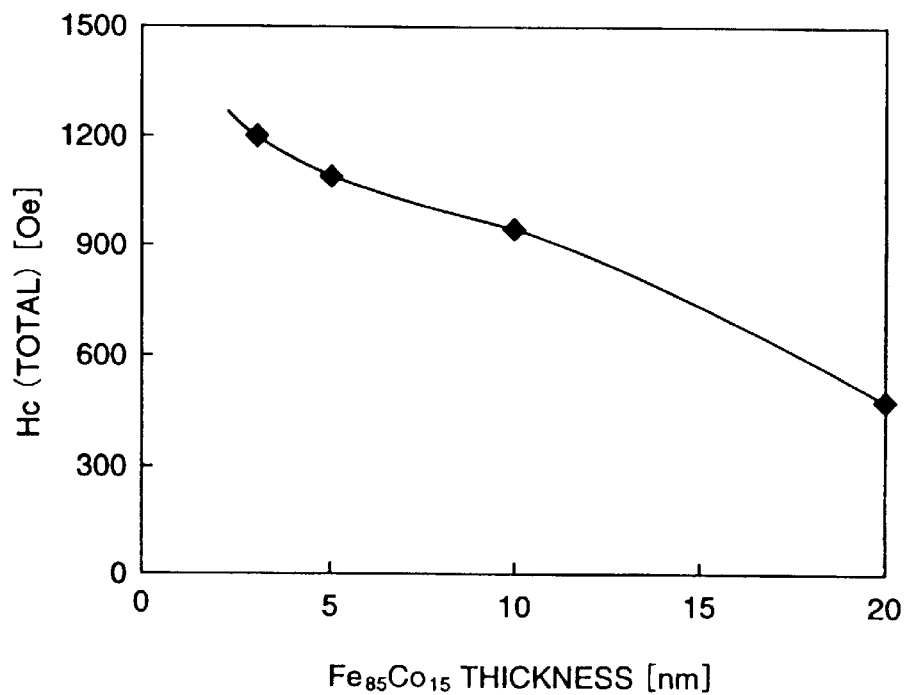
FIG. 11 is a diagram showing dependency of a coercive force $Hc^{total}$ as a laminate film of a hard magnetic biasing film on a thickness of a magnetic under layer.

Further, in FIG. 10, dependency of the remanent magnetization $Mr^{total}$ of a laminate film formed with the magnetic under layer 22 and the hard magnetic layer 23 on the thickness of the magnetic under layer 22 is shown, and, in FIG. 11, dependency of the coercive force $Hc^{total}$ of the laminate film on the thickness of the magnetic under layer 22 is shown. These figures show the results obtained for an FeCo alloy ($Fe_{85}Co_{15}$) as the magnetic under layer 22. Although it is desirable the Mr to increase due to the thickness increase of the magnetic under layer 22, on the contrary, the coercive force decreases. Therefore, while considering the above described incidence of Barkhausen noise, it is preferable to decide the film thickness of the magnetic under layer 22 according to the required coercive force.

As described above, although it is important to use a hard magnetic layer 23 of high Ms, in the hard magnetic material, the Ms is normally not so high. On the contrary, by forming a hard magnetic layer 23 on a magnetic under layer 22 of high Ms, $Ms^{total}$ of a hard magnetic biasing film 21 as a whole can be enhanced. Thus, also by heightening $Ms^{total}$ of the hard magnetic biasing film as a whole with a magnetic under layer of high Ms, the magnetization instability of the hard magnetic biasing film 21 accompanying magnetization rotation of the free layer 15 can be annulled. Thereby, occurrence of noise can be suppressed.

Upon materializing such a state, in the present invention, for a magnetic under layer 22, a magnetic material layer possessing a saturation magnetization $Ms^{under}$ which value is not smaller than a saturation magnetization $Ms^{hard}$ of the hard magnetic layer 23, that is, satisfies $Ms^{under} \geq Ms^{hard}$, is used. In other words, by employing a magnetic under layer 22 satisfying $Ms^{under} \geq Ms^{hard}$, the noise occurrence due to instability of magnetization of the magnetic under layer 22 can be suppressed.

Figure 12:
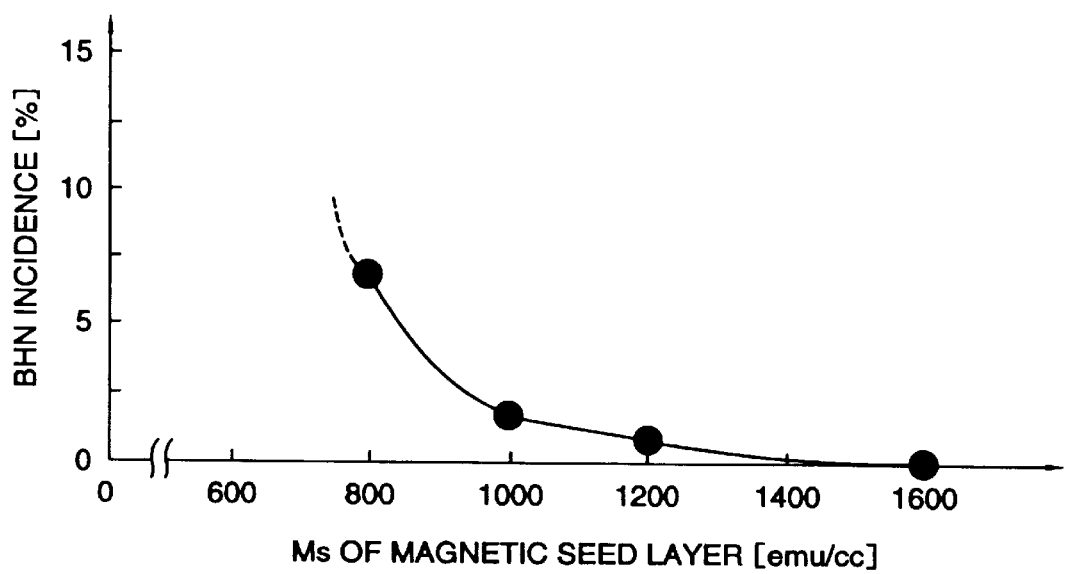
FIG. 12 is a diagram showing a relationship between a saturation magnetization $Ms^{under}$ of a magnetic under layer and incidence of Barkhausen noise.

A specific saturation magnetization $Ms^{under}$ of the magnetic under layer 22 is preferable to be 1000 emu/cc or more to stabilize the direction of magnetization and to heighten Ms of the hard magnetic biasing film 21 as a whole. In FIG. 12, relationship between the saturation magnetization $Ms^{under}$ of the magnetic under layer 22 and the incidence of Barkhausen noise is shown. When the $Ms^{under}$ is 1000 emu/cc or more, particularly the incidence of Barkhausen noise becomes low.

Figure 13:
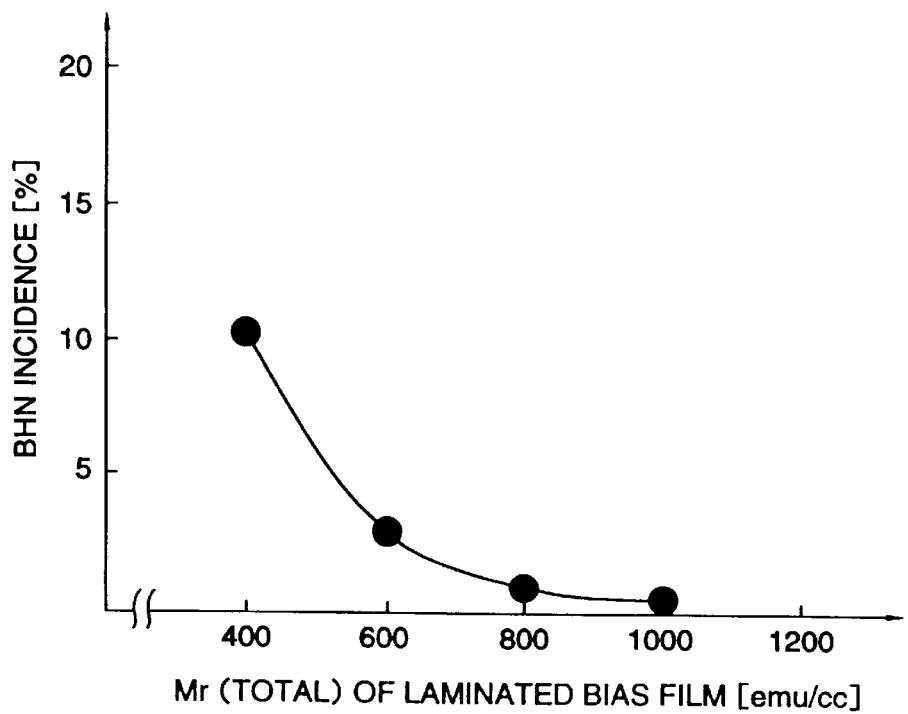
FIG. 13 is a diagram showing a relationship a remanent magnetization $Mr^{total}$ as a laminate film of a bias magnetic field inputting layer and incidence of Barkhausen noise.

In addition, from the identical reason, a total remanent magnetization $Mr^{total}$ of a laminate film composed of the magnetic under layer 22 and the hard magnetic layer 23 is preferable to be 600 emu/cc or more. In FIG. 13, relationship between the remanent magnetization $Mr^{total}$ of the hard magnetic biasing film as a laminate film and incidence of Barkhausen noise is shown. When the $Mr^{total}$ is 600 emu/cc or more, particularly the incidence of Barkhausen noise is low.

Although the magnetic under layer 22 can possesses $Ms^{under}$ satisfying at least one condition of $Ms^{under} \geq Ms^{free}$ and $Ms^{under} \geq Ms^{hard}$, in order to further stabilize the suppression effect of Barkhausen noise, $Ms^{under}$ is more preferable to satisfy both of $Ms^{under} \geq Ms^{free}$ and $Ms^{under} \geq Ms^{hard}$.

As described above, at the same time with heightening of Ms of the magnetic under layer 22, it is also important to heighten $Hk^{grain}$ of the hard magnetic layer 23. As to this point, since the magnetic under layer 22 concurrently serves as a crystal seed film of the hard magnetic layer 23, by appropriate material selection, the $Hk^{grain}$ of the hard magnetic layer 23 can be fully enhanced.

Figure 14A:
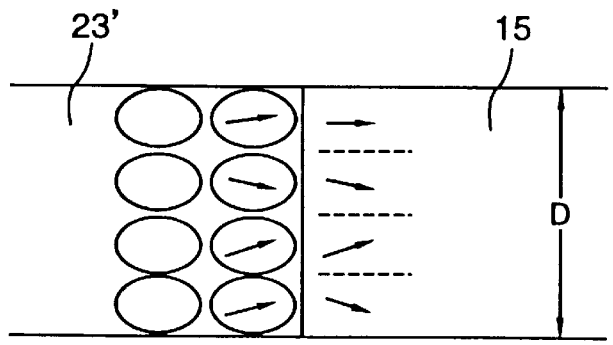
FIG. 14A and FIG. 14B are diagrams for explaining magnetic dispersion states of hard magnetic layers.
Figure 14B:
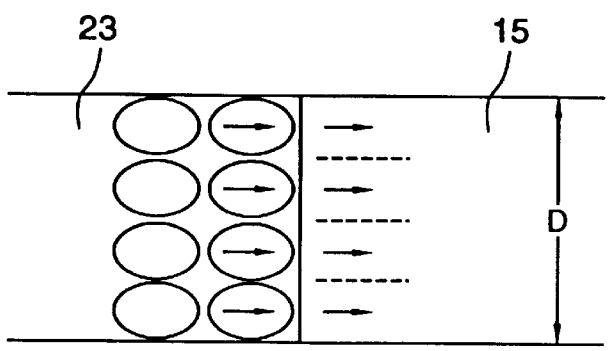

Further, when depth becomes narrow due to high densification, magnetization dispersion of the hard magnetic layer 23 becomes problematic. These situations are shown in FIG. 14A and FIG. 14B. As shown in FIG. 14A, when a Bloch wall like entity is formed in the free layer 15 due to magnetization dispersion of the hard magnetic layer 23', it is considered that the entity can be a cause of noise occurrence. Here, in FIG. 14A and FIG. 14B, D is length of the depth and, when it is 1 μm or less, the noise becomes remarkable.

From these, suppression of dispersion of the magnetization direction of the hard magnetic layer 23, namely, enhancement of the squareness ratio S(=Mr/Ms) of the hard magnetic layer 23 becomes important. Such problem also can be solved by taking advantage of the magnetic under layer 22. That is, although coercive force Hc of the hard magnetic layer 23 decreases due to stacking of the magnetic under layer 22 and the hard magnetic layer 23, the squareness ratio S increases. That is, since fluctuation of the direction of the magnetization within a plane can be suppressed, as shown in FIG. 14B, a state where the direction of the magnetization of the hard magnetic layer 23 is made uniform can be materialized.

Further, as to lowering of the coercive force of the hard magnetic layer 23, by the effect of the magnetic under layer 22, about 1000 Oe, not particularly problematic, can be materialized. It is because 1000 Oe is enough value to maintain stable longitudinal bias.

Figure 15:
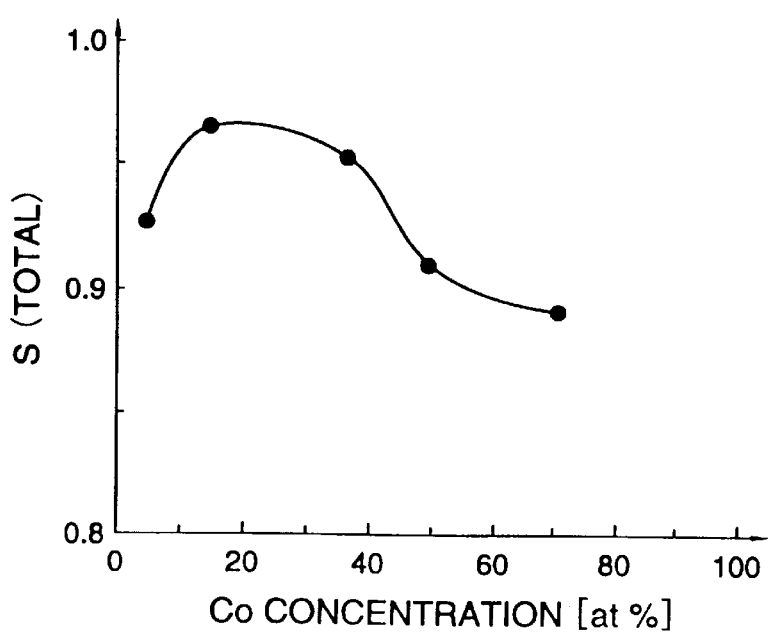
FIG. 15 is a diagram showing Co concentration dependency of squareness ratio S.
Figure 16:
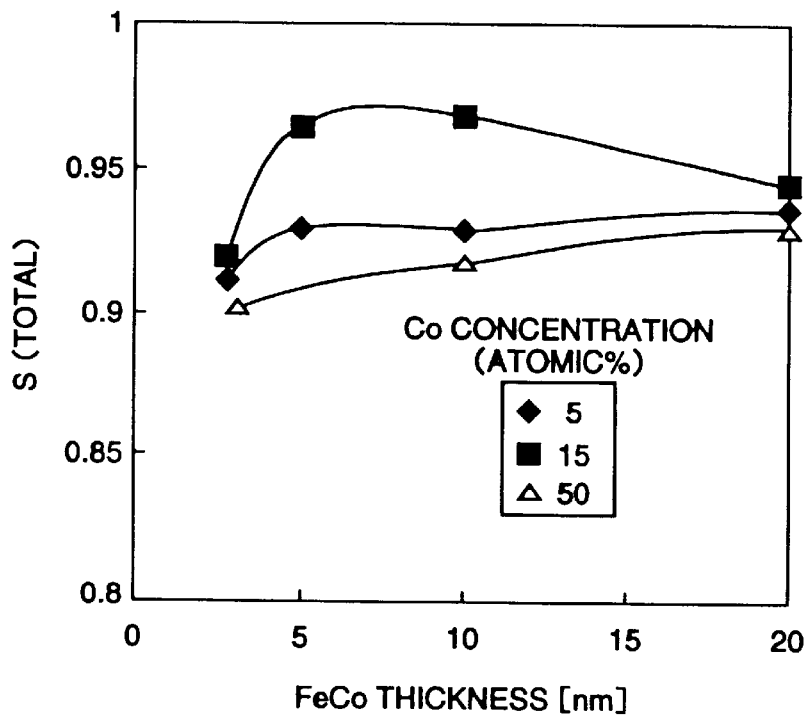
FIG. 16 is a diagram showing relationship between film thicknesses of FeCo alloy films and squareness ratios S when Co concentrations are varied.

In order to satisfy the above described conditions, an FeCo alloy large in its saturation magnetization is preferably used as the magnetic under layer 22. In Table 1, magnetic characteristics (coercive force Hc and saturation magnetization Ms when the film thickness of an FeCo alloy is 5 nm) of the FeCo alloys of various compositions are shown. In addition, in FIG. 15 and FIG. 16, Co concentration dependency of the squareness ratio S of the FeCo alloy is shown. In FIG. 15, the squareness ratio $S^{total}$ is shown when a CoPt film of 22 nm thickness is formed on an FeCo alloy film of 5 nm thickness. In FIG. 16, relationship between the film thickness of the FeCo alloy film and the squareness ratio S is shown for various Co concentrations.

TABLE 1

| FeCo alloy composition (at %) | $Fe_{85}Co_{15}$ | $Fe_{95}Co_5$ | $Fe_{50}Co_{50}$ |
|---|---|---|---|
| Coercive Force Hc (Oe) | 19 | 20 | 30 |
| Saturation Magnetization Ms (emu/cc) | 1600 | 1425 | 1675 |

From Table 1, FIG. 15 and FIG. 16, it is obvious that Co concentration in the FeCo alloy is preferable to be 40 at % or less when high Ms and high squareness ratio S are to be obtained. Besides, since corrosion resistance decreases when Co concentration is too low, 5 at % or more of Co concentration is preferable. Thus, an FeCo alloy containing Co in the range of from 5 to 40 at % is particularly preferable for the magnetic under layer 22.

For a hard magnetic layer 23, various kinds of Co based hard magnetic alloys such as a CoPt alloy and a CoCrPt alloy can be used. Although these Co based hard magnetic alloys are excellent in hard magnetism and corrosion resistance, from a view point of materializing high Hc and high Mr through exchange coupling with the high Ms magnetic under layer 22 as described above, it is preferable to use a hard magnetic material of high Ms. From these reasons, a CoPt alloy is preferable than a CoCrPt alloy for the hard magnetic layer 23.

As a specific constitution of a hard magnetic biasing film 21 preferable for the present invention, a laminate film composed of a magnetic under layer 22 consisting of $Fe_{85}Co_{15}$ and a hard magnetic layer 23 consisting of $Co_{80}Pt_{20}$ can be cited. For example, a laminate film of $Fe_{85}Co_{15}$(5 nm)/$Co_{80}Pt_{20}$(40 nm) formed in film on a gap consisting of $AlO_x$ with a magnetron sputtering method in the same vacuum atmosphere shows an M-H curve integrated by exchange coupling of two layers. The coercive force within its plane $Hc^{total}$ of this two-layered laminate film was 1050 Oe, the remanent magnetization $Mr^{total}$ was 980 emu/cc, and the squareness ratio S was 0.94.

By combining an FeCo magnetic under layer of high Ms and a CoPt hard magnetic layer of high Ms, while satisfying the coercive force practically non-problematic even when a CoPt hard magnetic layer is formed on a magnetic under layer, high Ms and low dispersion (high S) which can not be materialized with a CoPt hard magnetic single layer only can be materialized. Magnetic properties are shown in from FIG. 17 to FIG. 20 with film thickness of the FeCo alloy film fixed at 5 nm and the film thickness of the CoPt alloy film varying.

Figure 17:
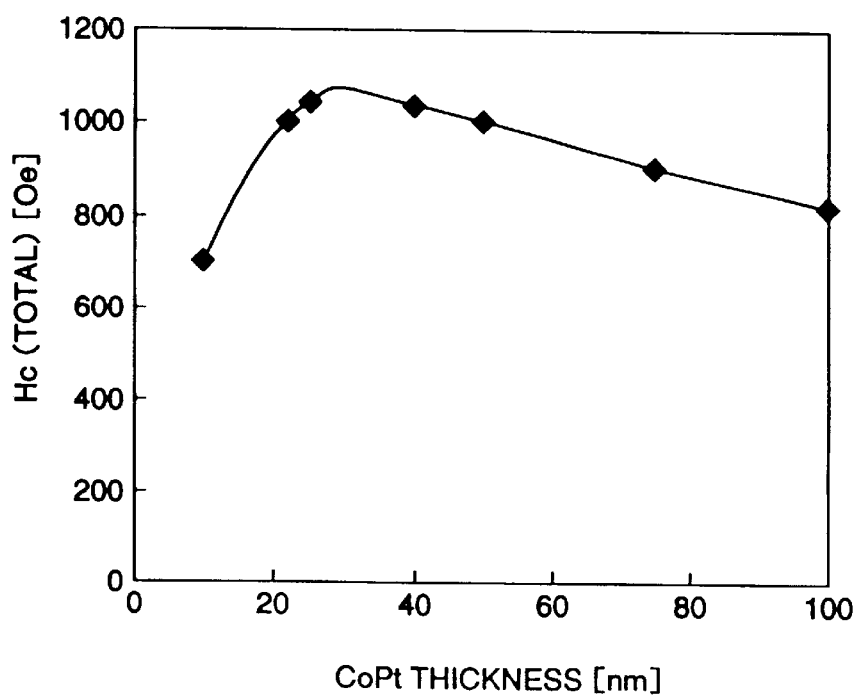
FIG. 17 is a diagram showing a relationship between film thicknesses of CoPt alloy films and coercive forces $Hc^{total}$ of hard magnetic biasing films as a laminate film.

From FIG. 17, although the Hc decreases a little when the film thickness of the CoPt alloy becomes thick(40 nm or more), decrease of the Hc is suppressed in the range practically non-problematic due to the effect of the FeCo alloy film as a under layer. Besides, when the film thickness of the CoPt alloy film becomes thin, although the coercive force decreases increasing with (Ms×t of magnetic hard layer)/ (Ms×t of hard magnetic layer) when it is exchange coupled with the FeCO alloy film, if the coercive force is in the range shown in FIG. 17, there is no problem from the practical point of view.

Figure 18:
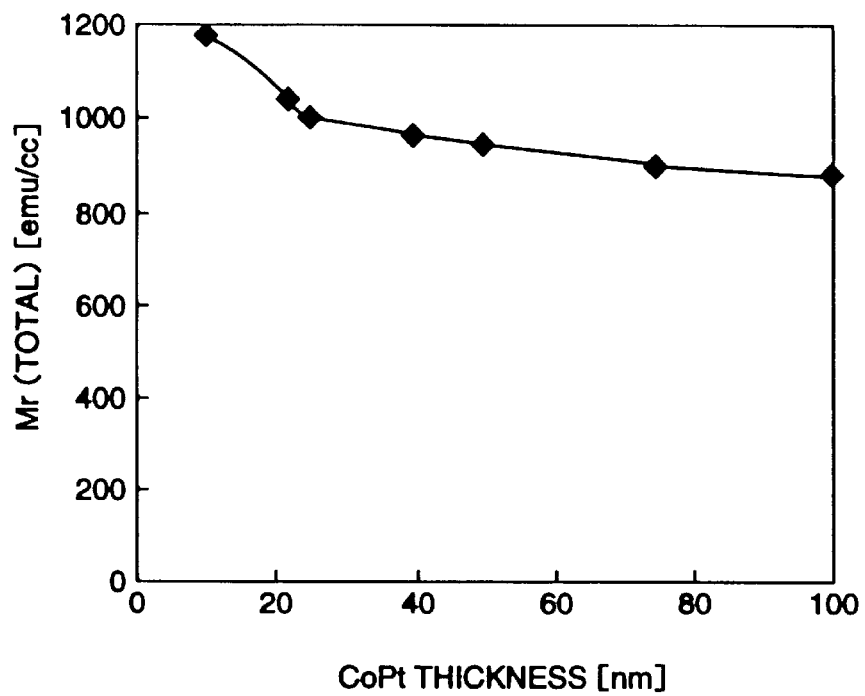
FIG. 18 is a diagram showing a relationship between film thicknesses of CoPt alloy films and remanent magnetization $Mr^{total}$ of hard magnetic biasing films as a laminate film.

From FIG. 18, it is obvious that, due to the effect of the FeCo alloy film(under layer) of high Ms, the total $Mr^{total}$ of the two-layered laminate film materializes Mr high such as 800 emu/cc or more at any film thickness. A bias magnetic field inputting layer of such high Mr as that any hard magnetic single film can not materialize is obtained by laminating with an FeCo seed film of high Ms.

Figure 19:
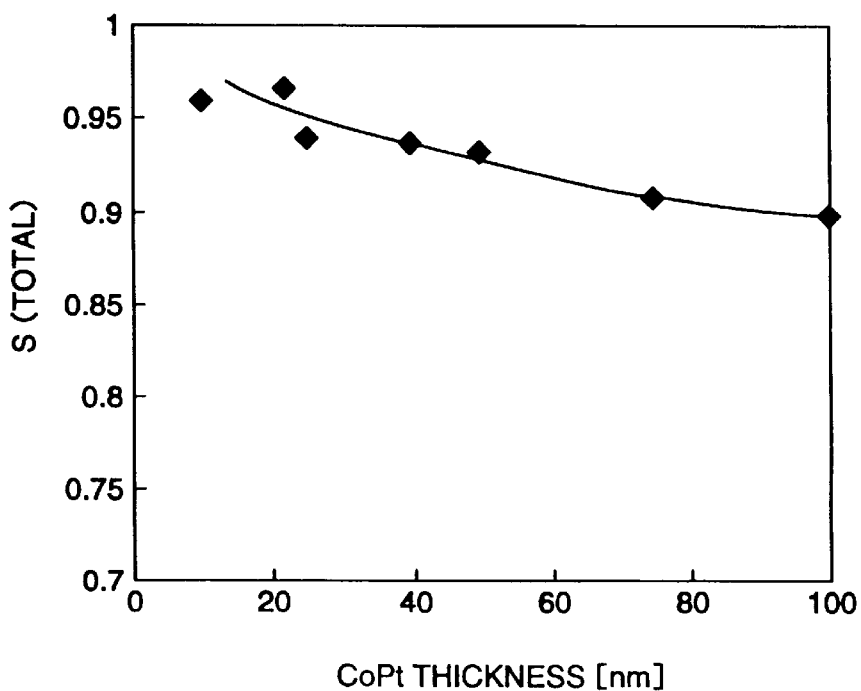
FIG. 19 is a diagram showing a relationship between film thicknesses of CoPt alloy films and squareness ratios $S^{total}$ of hard magnetic biasing films as a laminate film.
Figure 20:
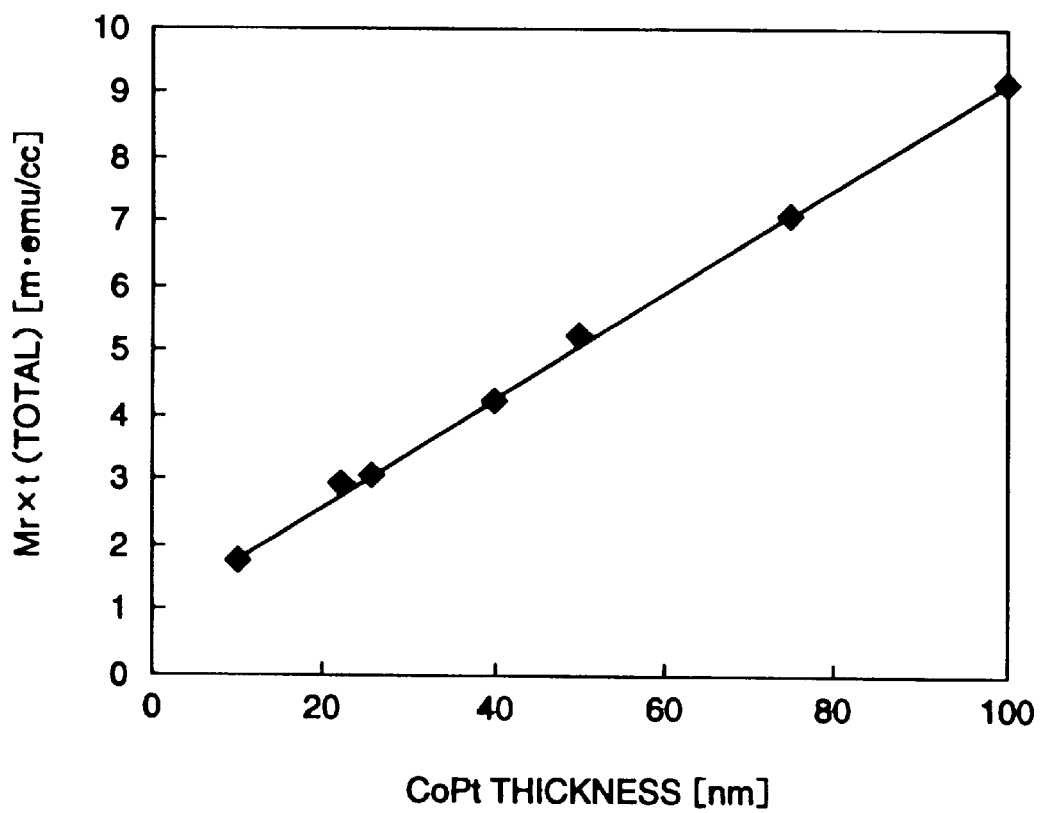
FIG. 20 is a diagram showing a relationship between film thicknesses of CoPt alloy films and $Mr \times t^{(total)}$ of hard magnetic biasing films.

From FIG. 19, it is understood that the squareness ratio $S^{total}$ also can be made very high in the region thin in film thickness of a CoPt alloy film, namely a film small in its dispersion can be obtained. Even when the film thickness of the CoPt seed film is increased up to 80 nm, its maintains still such a high value as 0.9 or more, and it is understood that, due to the effect of the FeCo seed film, generation of perpendicular orientation of c-axis of Co-based hard magnetic alloy can be suppressed in case that film thickness is increased. This can be also read from FIG. 20. Linearity is very good between the film thickness of the CoPt alloy film and $Mr×t^{(total)}$, any deviation from the linearity of $Mr×t^{(total)}$ due to increase of the film thickness of the CoPt alloy film can not be found.

The shield type GMR head 28 of the above described embodiments is obtained by forming a hard magnetic biasing film 21 and electrode 24 integrally into a film as well by patterning in single PEP step. Even when the hard magnetic biasing film 21 and the electrode are patterned in two PEP steps due to high densification, the present invention can be applied in the same way. The constitution in this case is shown in FIG. 21.

Figure 21:
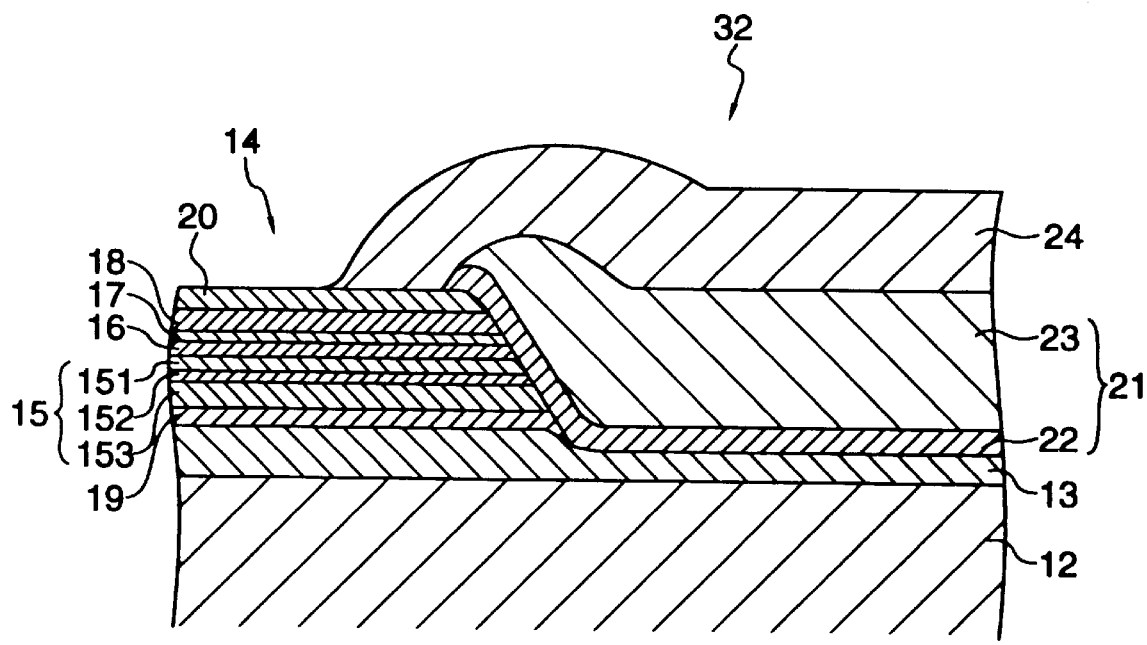
FIG. 21 is a sectional view showing a structure of an essential portion of a modified example of the magneto-resistance effect head shown in FIG. 2.
Figure 22:
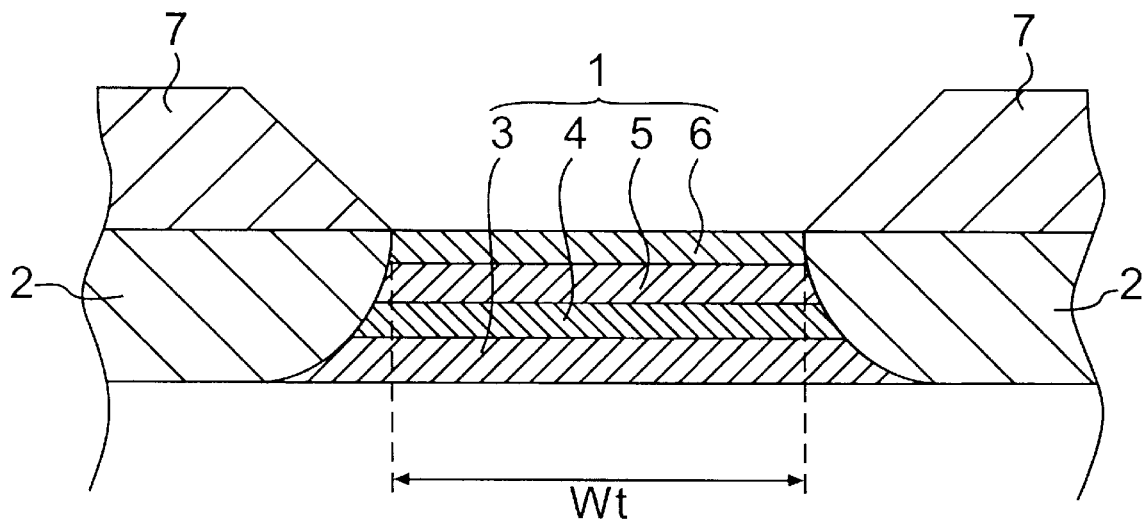
FIG. 22 is a sectional view showing a structure of an essential portion of one configuration example of a magneto-resistance effect head of a conventional abutted junction structure.

The shield type GMR head 32 constitution of which essential portion is shown in FIG. 21 is formed in such a manner that the electrode 24 is partly overlapped with a spin valve GMR film 14. In this case, the track width is restricted by a pair of electrodes 24. According to a shield type GMR head 32 of such a structure, too strong static magnetic field bias in the central portion of the free layer 15 due to narrowing of the track width can be avoided. Further, contact resistance between the electrode 24 and the spin valve GMR film 14 can be lowered. Further, other specific constitutions and the effects due to them are identical as the above described embodiments.

As obvious from the above described embodiments, according to the magneto-resistance effect head of the present invention, since a magnetic layer high in its saturation magnetization is used as a under layer of the hard magnetic layer, for example, even when the free layer of high saturation magnetization is used, Barkhausen noise can be effectively eliminated. In particular, occurrence of Barkhausen noise due to narrowing of the track width can be effectively suppressed.

What is claimed is:

1. A magneto-resistance effect head, comprising:

a magneto-resistance effect film which has a free layer whose magnetization direction changes corresponding to an external magnetic field, a non-magnetic layer stacked on the free layer thereabove, and a pinned layer stacked on the non-magnetic layer thereabove;

a magnetic biasing film which has a magnetic under layer and a hard magnetic layer formed on the magnetic under layer by stacking, wherein the hard magnetic layer is adjoined to an edge portion of the magneto-resistance effect film through the magnetic under layer; and an electrode supplying sense current to the magneto-resistance effect film, wherein, when saturation magnetization of the magnetic under layer is $Ms^{under}$ and saturation magnetization of the free layer is $Ms^{free}$, the magnetic under layer satisfies a relation of $Ms^{under} \geq Ms^{free}$.

2. The magneto-resistance effect head as set forth in claim 1:

wherein, when saturation magnetization of the hard magnetic layer is $Ms^{hard}$, the magnetic under layer satisfies a relation of $Ms^{under} \geq Ms^{hard}$.

3. The magneto-resistance effect head as set forth in claim 1:

wherein, the magnetic biasing film has remanent magnetization $Mr^{total}$ of 600 emu/cc or more.

4. The magneto-resistance effect head as set forth in claim 1:

wherein, the saturation magnetization $Ms^{under}$ of the magnetic under layer is 1000 emu/cc or more.

5. The magneto-resistance effect head as set forth in claim 1:

wherein, saturation magnetization $Ms^{free}$ of the free layer is 800 emu/cc or more.

6. The magneto-resistance effect head as set forth in claim 1:

wherein, a length of the magneto-resistance effect film along track width direction is 3 μm or less.

7. The magneto-resistance effect head as set forth in claim 1:

wherein, when the saturation magnetization and thickness of the magnetic under layer are $Ms^{under}$ and $t^{under}$ respectively and saturation magnetization and thickness of the hard magnetic layer are $Ms^{hard}$ and $t^{hard}$ respectively, the magnetic under layer and the hard magnetic layer satisfy a relation of $Ms^{under} \times t^{under} \leq Ms^{hard} \times t^{hard}$.

8. The magneto-resistance effect head as set forth in claim 1:

wherein, the free layer comprises a magnetic layer containing at least Co.

9. The magneto-resistance effect head as set forth in claim 1:

wherein, the free layer has at least a CoFe alloy layer.

10. The magneto-resistance effect head as set forth in claim 1:

wherein, the magnetic under layer comprises an FeCo alloy.

11. A magneto-resistance effect head, comprising:

a magneto-resistance effect film which has a free layer whose direction of magnetization changes corresponding to an external magnetic field, a non-magnetic layer laminated on the free layer thereabove, and a pinned layer laminated on the non-magnetic layer thereabove;

a magnetic biasing film which has a magnetic under layer and a hard magnetic layer formed on the magnetic under layer by lamination, wherein the hard magnetic layer is adjoined to an edge portion of the magneto-resistance effect film through the magnetic under layer; and an electrode supplying sense current to the magneto-resistance effect film, wherein, when saturation magnetization of the magnetic under layer is $Ms^{under}$ and saturation magnetization of the hard magnetic layer is $Ms^{hard}$, the magnetic under layer satisfies a relation of $Ms^{under} \geq Ms^{hard}$.

12. The magneto-resistance effect head as set forth in claim 11:

wherein, the magnetic biasing film has remanent magnetization $Mr^{total}$ of 600 emu/cc or more.

13. The magneto-resistance effect head as set forth in claim 11:

wherein, the saturation magnetization $Ms^{under}$ of the magnetic under layer is 1000 emu/cc or more.

14. The magneto-resistance effect head as set forth in claim 11:

wherein, the saturation magnetization $Ms^{free}$ of the free layer is 800 emu/cc or more.

15. The magneto-resistance effect head as set forth in claim 11:

wherein, a length of the magneto-resistance effect film along track width direction is 3 μm or less.

16. The magneto-resistance effect head as set forth in claim 11:

wherein, when a thickness of the magnetic under layer is $t^{under}$ and a thickness of the hard magnetic layer is $t^{hard}$, the magnetic under layer and the hard magnetic layer satisfy a relation of $Ms^{under} \times t^{under} \leq Ms^{hard} \times t^{hard}$.

17. The magneto-resistance effect head as set forth in claim 11:

wherein, the free layer comprises a magnetic layer containing at least Co.

18. The magneto-resistance effect head as set forth in claim 11:

wherein, the free layer has at least a CoFe alloy layer.

19. The magneto-resistance effect head as set forth in claim 11:

wherein, the magnetic under layer comprises an FeCo alloy.

* * * * *